(12) United States Patent
Cheng

(10) Patent No.: US 10,389,648 B2
(45) Date of Patent: Aug. 20, 2019

(54) METHOD AND APPARATUS FOR CONTROLLING SCHEDULING PACKET

(71) Applicant: Huawei Technologies Co., Ltd., Shenzhen (CN)

(72) Inventor: Biao Cheng, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 15/887,355

(22) Filed: Feb. 2, 2018

(65) Prior Publication Data
US 2018/0159787 A1 Jun. 7, 2018

Related U.S. Application Data

(63) Continuation of application No. PCT/CN2015/085989, filed on Aug. 4, 2015.

(51) Int. Cl.
*H04L 12/873* (2013.01)
*H04L 12/18* (2006.01)
(Continued)

(52) U.S. Cl.
CPC .............. *H04L 47/52* (2013.01); *H04L 12/18* (2013.01); *H04L 47/628* (2013.01);
(Continued)

(58) Field of Classification Search
CPC ..... H04L 12/18; H04L 47/52; H04L 47/6265; H04L 47/628; H04L 47/72; H04L 47/806; H04W 72/12
See application file for complete search history.

(56) References Cited

U.S. PATENT DOCUMENTS

| 8,306,544 B2 | 11/2012 | Ishii et al. |
| 2007/0071031 A1 | 3/2007 | Shin et al. |

(Continued)

FOREIGN PATENT DOCUMENTS

| CN | 101790234 A | 7/2010 |
| CN | 102231697 A | 11/2011 |

(Continued)

OTHER PUBLICATIONS

CABLE LABS®, "Data Over Cable Service Interface Specifications DOCSIS® 3.0," Physical Layer Specification CM-SP-PHYv3.0-I11-130808, Aug. 8, 2013, 200 pages.
(Continued)

*Primary Examiner* — Mewale A Ambaye
(74) *Attorney, Agent, or Firm* — Slater Matsil, LLP

(57) ABSTRACT

Embodiments provide a method and an apparatus for controlling a scheduling packet. The method is applied to an HFC network system. The method includes: determining, by a network device, a transmission bandwidth of a first scheduling packet; determining a target quantity according to a first control threshold when the transmission bandwidth of the first scheduling packet is greater than or equal to the first control threshold, where the target quantity is less than or equal to a quantity of IEs included in the first scheduling packet; and generating a second scheduling packet according to the target quantity, where a quantity of IEs included in the second scheduling packet is less than the target quantity, the second scheduling packet includes an IE used to carry resource allocation information for a second uplink period, and the second uplink period follows the first uplink period.

14 Claims, 5 Drawing Sheets

100

A network device determines a transmission bandwidth of a first scheduling packet, where the first scheduling packet includes an IE used to carry resource allocation information for a first uplink period, and the resource allocation information for the first uplink period is used to indicate a transmission resource to be used by user equipment to send uplink data in the first uplink period — S110

Determine a target quantity according to a first control threshold when the transmission bandwidth of the first scheduling packet is greater than or equal to the first control threshold, where the target quantity is less than or equal to a quantity of IEs included in the first scheduling packet — S120

Generate a second scheduling packet according to the target quantity, where the second scheduling packet includes an IE used to carry resource allocation information for a second uplink period, the resource allocation information for the second uplink period is used to indicate a transmission resource to be used by the user equipment to send uplink data in the second uplink period, a quantity of IEs included in the second scheduling packet is less than the target quantity, and the second uplink period follows the first uplink period — S130

(51) Int. Cl.
*H04W 72/12* (2009.01)
*H04L 12/863* (2013.01)
*H04L 12/911* (2013.01)
*H04L 12/927* (2013.01)

(52) U.S. Cl.
CPC .......... *H04L 47/6265* (2013.01); *H04L 47/72* (2013.01); *H04L 47/806* (2013.01); *H04W 72/12* (2013.01)

(56) References Cited

U.S. PATENT DOCUMENTS

| | | | |
|---|---|---|---|
| 2008/0285488 A1* | 11/2008 | Walton | H04B 7/022 370/280 |
| 2013/0322882 A1 | 12/2013 | Fang et al. | |
| 2015/0085797 A1* | 3/2015 | Ji | H04J 3/16 370/329 |
| 2015/0087352 A1 | 3/2015 | Lim et al. | |
| 2016/0183278 A1 | 6/2016 | Chao et al. | |
| 2016/0211983 A1* | 7/2016 | Zhang | H04Q 11/0067 |
| 2017/0019914 A1* | 1/2017 | Rune | H04W 72/1284 |

FOREIGN PATENT DOCUMENTS

| | | |
|---|---|---|
| CN | 102938743 A | 2/2013 |
| CN | 103260245 A | 8/2013 |
| CN | 103718633 A | 4/2014 |
| CN | 103875240 A | 6/2014 |

OTHER PUBLICATIONS

CABLE LABS®, "Data Over Cable Service Interface Specifications DOCSIS® 3.1," Physical Layer Specification, CM-SP-PHYv3.1-I02-140320, Mar. 20, 2014, 236 pages.

* cited by examiner

100

┌──────────────────────────────────────────────────────────┐
│ A network device determines a transmission bandwidth of a first │
│ scheduling packet, where the first scheduling packet includes an IE used │
│ to carry resource allocation information for a first uplink period, and the │   S110
│ resource allocation information for the first uplink period is used to │
│ indicate a transmission resource to be used by user equipment to send │
│ uplink data in the first uplink period │
└──────────────────────────────────────────────────────────┘

┌──────────────────────────────────────────────────────────┐
│ Determine a target quantity according to a first control threshold when │
│ the transmission bandwidth of the first scheduling packet is greater than │   S120
│ or equal to the first control threshold, where the target quantity is less │
│ than or equal to a quantity of IEs included in the first scheduling packet │
└──────────────────────────────────────────────────────────┘

┌──────────────────────────────────────────────────────────┐
│ Generate a second scheduling packet according to the target quantity, │
│ where the second scheduling packet includes an IE used to carry resource │
│ allocation information for a second uplink period, the resource allocation │
│ information for the second uplink period is used to indicate a │   S130
│ transmission resource to be used by the user equipment to send uplink │
│ data in the second uplink period, a quantity of IEs included in the second │
│ scheduling packet is less than the target quantity, and the second uplink │
│ period follows the first uplink period │
└──────────────────────────────────────────────────────────┘

FIG. 1

Byte

| MAC management information header | | | |
|---|---|---|---|
| Uplink channel ID | UCD counter | Quantity of information elements | Reserved |
| Allocation start time | | | |
| Acknowledgment time | | | |
| Start ranging rollback | End ranging rollback | Start data rollback | End data rollback |
| Map information element IE | | | |

FIG. 3

Allocate one target IE to at least two uplink transmission resource requests, where the target IE is used to carry resource allocation information that is of uplink data and that is corresponding to the at least two uplink transmission resource requests, the at least two uplink transmission resource requests are from same user equipment, and services corresponding to the at least two uplink transmission resource requests have a same service type — S131

Generate a second scheduling packet including the target IE — S132

FIG. 4

| | Byte | | |
|---|---|---|---|
| First time interval | SID | IUC | Offset=0 |
| Second time interval | SID | IUC | Offset |
| ⋯ | ⋯ | ⋯ | ⋯ |
| Last time interval | SID | IUC | Offset |
| List ends (Empty IE) | SID=0 | IUC=7 | Offset=Length of a map packet |
| | SID | IUC | Offset=Length of a map packet |
| Data acknowledgment and grant pending | ⋯ | ⋯ | ⋯ |
| | SID | IUC | Offset=Length of a map packet |

FIG. 5

METHOD AND APPARATUS FOR CONTROLLING SCHEDULING PACKET

CROSS-REFERENCE TO RELATED APPLICATIONS

This application is a continuation of International Application No. PCT/CN2015/085989, filed on Aug. 4, 2015, the disclosure of which is hereby incorporated by reference in its entirety.

TECHNICAL FIELD

The present invention relates to the communications field, and more specifically, to a method and an apparatus for controlling a scheduling packet.

BACKGROUND

Currently, in a hybrid fiber-coaxial (HFC) network system, downlink data is sent on a downlink channel in a broadcast manner, and uplink data is transmitted based on resource scheduling of a network device. That is, after receiving an uplink transmission request sent by user equipment, the network device may allocate a transmission resource to the user equipment, and deliver allocation information of the transmission resource to the user equipment using a scheduling packet. In addition, the scheduling packet also needs to be sent on the downlink channel in a broadcast manner. Therefore, when the network device receives a large quantity of uplink transmission requests, a transmission bandwidth of the scheduling packet increases accordingly. If a system provides a fixed total bandwidth of the downlink channel, a bandwidth of downlink data is reduced, and therefore downlink data transmission is seriously affected.

SUMMARY

Embodiments of the present invention provide a method and an apparatus for controlling a scheduling packet, so that downlink data transmission is less affected by transmission of a scheduling packet.

According to a first aspect, a method for controlling a scheduling packet is provided, where the method is applied to a hybrid fiber-coaxial network system. The method includes: determining, by a network device, a transmission bandwidth of a first scheduling packet, where the first scheduling packet includes an information element (IE) used to carry resource allocation information for a first uplink period, and the resource allocation information for the first uplink period indicates a transmission resource to be used by user equipment to send uplink data in the first uplink period. The method also includes determining a target quantity according to a first control threshold when the transmission bandwidth of the first scheduling packet is greater than or equal to the first control threshold, where the target quantity is less than or equal to a quantity of IEs included in the first scheduling packet. The method also includes generating a second scheduling packet according to the target quantity, where the second scheduling packet includes an IE used to carry resource allocation information for a second uplink period, the resource allocation information for the second uplink period indicates a transmission resource to be used by the user equipment to send uplink data in the second uplink period, a quantity of IEs included in the second scheduling packet is less than the target quantity, and the second uplink period follows the first uplink period.

With reference to the first aspect, in a first implementation of the first aspect, the generating a second scheduling packet includes: allocating one target IE to at least two uplink transmission resource requests, where the target IE is used to carry resource allocation information that is of uplink data and that corresponds to the at least two uplink transmission resource requests, the at least two uplink transmission resource requests are from same user equipment, and services corresponding to the at least two uplink transmission resource requests have a same service type; and generating the second scheduling packet including the target IE.

With reference to the first aspect or the foregoing implementation, in a second implementation of the first aspect, the allocating one target IE to at least two uplink transmission resource requests includes allocating one target IE to at least two uplink transmission resource requests that carry a same service identifier, where a service identifier is used to uniquely indicate user equipment and a service type.

With reference to the first aspect or the foregoing implementations, in a third implementation of the first aspect, duration of the second uplink period is greater than duration of the first uplink period.

With reference to the first aspect or the foregoing implementations, in a fourth implementation of the first aspect, the method further includes determining the first control threshold according to a transmission bandwidth of downlink data.

With reference to the first aspect or the foregoing implementations, in a fifth implementation of the first aspect, the method further includes: determining at least one preset threshold, where each preset threshold corresponds to a bandwidth range; and determining the first control threshold from the at least one preset threshold according to a bandwidth range in which a sum of the transmission bandwidth of the first scheduling packet and the transmission bandwidth of the downlink data falls.

With reference to the first aspect or the foregoing implementations, in a sixth implementation of the first aspect, the user equipment is a cable modem, the network device is a cable modem termination system, and the scheduling packet is a bandwidth allocation mapping packet.

According to a second aspect, an apparatus for controlling a scheduling packet is provided, where the apparatus is applied to a hybrid fiber-coaxial network system. The apparatus includes a determining module, configured to determine a transmission bandwidth of a first scheduling packet. The first scheduling packet includes an information element (IE) used to carry resource allocation information for a first uplink period, and the resource allocation information for the first uplink period indicates a transmission resource to be used by user equipment to send uplink data in the first uplink period. The determining module is also configured to determine a target quantity according to a first control threshold when the determining module determines that the transmission bandwidth of the first scheduling packet is greater than or equal to the first control threshold. The target quantity is less than or equal to a quantity of IEs included in the first scheduling packet. The apparatus also includes a generation module, configured to generate a second scheduling packet according to the target quantity determined by the determining module. The second scheduling packet includes an IE used to carry resource allocation information for a second uplink period. The resource allocation information for the second uplink period indicates a transmission resource to be used by the user equipment to send uplink data in the second uplink period. A quantity of IEs included in the second scheduling packet is less than the target quantity. The second uplink period follows the first uplink period.

With reference to the second aspect, in a first implementation of the second aspect, the determining module is further configured to allocate one target IE to at least two uplink transmission resource requests. The target IE is used to carry resource allocation information that is of uplink data and that corresponds to the at least two uplink transmission resource requests. The at least two uplink transmission resource requests are from same user equipment. Services corresponding to the at least two uplink transmission resource requests have a same service type. The generation module is further configured to generate the second scheduling packet including the target IE.

With reference to the second aspect and the foregoing implementation, in a second implementation of the second aspect, the determining module is further configured to allocate one target IE to at least two uplink transmission resource requests that carry a same service identifier, where a service identifier is used to uniquely indicate user equipment and a service type.

With reference to the second aspect or the foregoing implementations, in a third implementation of the second aspect, duration of the second uplink period is greater than duration of the first uplink period.

With reference to the second aspect or the foregoing implementations, in a fourth implementation of the second aspect, the determining module is further configured to determine the first control threshold according to a transmission bandwidth of downlink data.

With reference to the second aspect or the foregoing implementations, in a fifth implementation of the second aspect, the determining module is further configured to determine at least one preset threshold, where each preset threshold corresponds to a bandwidth range. The determining module is further configured to determine the first control threshold from the at least one preset threshold according to a bandwidth range in which a sum of the transmission bandwidth of the first scheduling packet and the transmission bandwidth of the downlink data falls.

With reference to the second aspect or the foregoing implementations, in a sixth implementation of the second aspect, the apparatus is a cable modem termination system, the user equipment is a cable modem, and the scheduling packet is a bandwidth allocation mapping packet.

According to the method and the apparatus in the embodiments of the present invention, the network device determines the target quantity according to the first control threshold when determining that the transmission bandwidth of the first scheduling packet is greater than or equal to the first control threshold, where the target quantity is less than or equal to the quantity of IEs included in the first scheduling packet; and generates the second scheduling packet according to the target quantity, where the quantity of IEs included in the second scheduling packet is less than the target quantity. The transmission bandwidth of the second scheduling packet is less than the first control threshold, and downlink data transmission is less affected by transmission of a scheduling packet.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

FIG. 1 is a schematic flowchart of a method for controlling a scheduling packet according to an embodiment of the present invention;

FIG. 3 is a schematic diagram of a structure of a scheduling packet according to an embodiment of the present invention;

FIG. 4 is another schematic flowchart of a method for controlling a scheduling packet according to an embodiment of the present invention;

FIG. 5 is a schematic diagram of a format of scheduling information according to an embodiment of the present invention;

DETAILED DESCRIPTION OF ILLUSTRATIVE EMBODIMENTS

Figure 2:
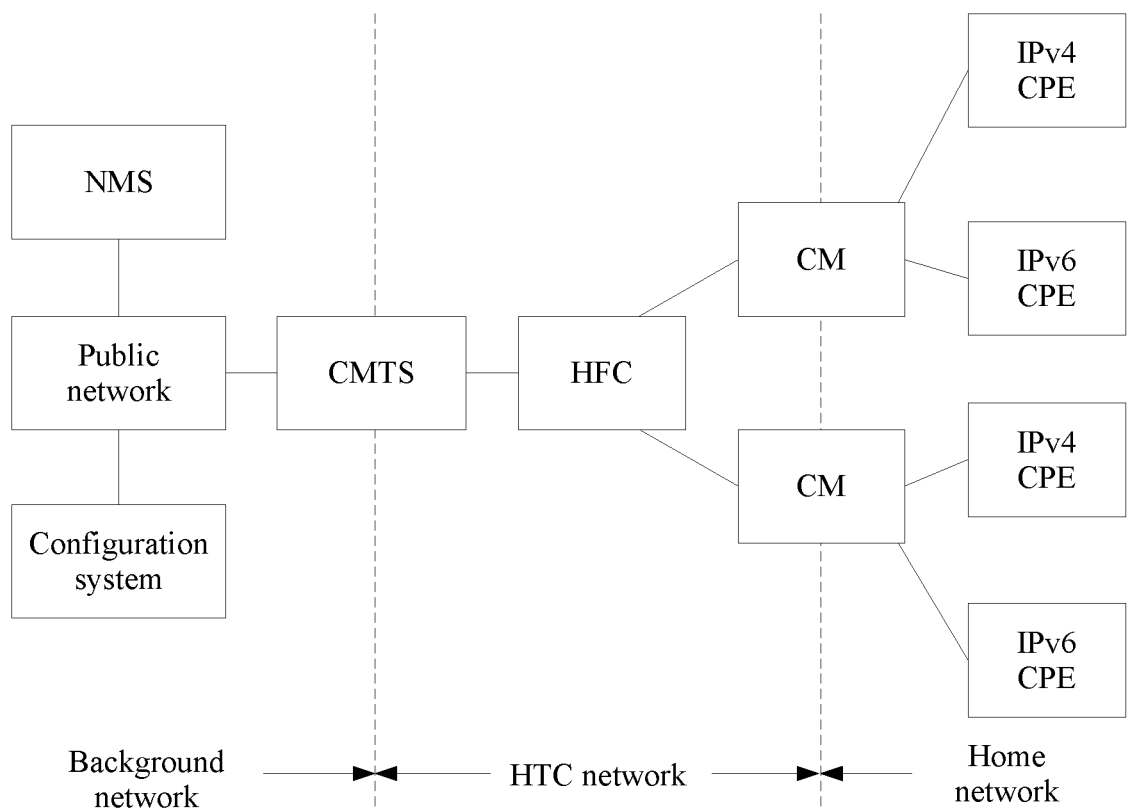
FIG. 2 is a schematic diagram of an example of a network system to which a method for controlling a scheduling packet is applied according to an embodiment of the present invention.

The following clearly describes the technical solutions in the embodiments of the present invention with reference to the accompanying drawings in the embodiments of the present invention. Apparently, the described embodiments are some rather than all of the embodiments of the present invention.

FIG. 1 is a schematic flowchart of a method 100 for controlling a scheduling packet from a perspective of a network device according to an embodiment of the present invention. The method 100 may be applied to an HFC network system. As shown in FIG. 1, the method 100 includes the following steps.

S110. The network device determines a transmission bandwidth of a first scheduling packet. The first scheduling packet includes an information element (IE) used to carry resource allocation information for a first uplink period. The resource allocation information for the first uplink period indicates a transmission resource to be used by user equipment to send uplink data in the first uplink period.

S120. Determine a target quantity according to a first control threshold when the transmission bandwidth of the first scheduling packet is greater than or equal to the first control threshold. The target quantity is less than or equal to a quantity of IEs included in the first scheduling packet.

S130. Generate a second scheduling packet according to the target quantity. The second scheduling packet includes an IE used to carry resource allocation information for a second uplink period. The resource allocation information for the second uplink period indicates a transmission resource to be used by the user equipment to send uplink data in the second uplink period. A quantity of IEs included in the second scheduling packet is less than the target quantity, and the second uplink period follows the first uplink period.

It should be understood that a technical solution in embodiments of the present invention may be applied to a communications system in which data is sent on a downlink channel in a broadcast manner and data is transmitted on an uplink channel based on scheduling of a network device, such as uplink time division multiplexing or frequency division multiplexing. A network device in the communications system may be a base station, for example, may be a base transceiver station (BTS) in GSM or CDMA, may be a NodeB (NB) in WCDMA, or may be an evolved NodeB (eNB) in LTE. This is not limited in the present invention. User equipment (UE) in the communications system may also be referred to as a mobile terminal, mobile user equipment, and the like. The user equipment may communicate with one or more core networks by using a radio access network (RAN). The user equipment may be a mobile terminal, such as a mobile phone (or referred to as a "cellular" phone), or a computer having a mobile terminal. For example, the user equipment may be a portable, pocket-sized, handheld, computer built-in, or in-vehicle mobile apparatus, which exchanges voice and/or data with the radio access network.

In an embodiment, the communications system may be a data over cable service interface specification (DOCSIS) standard copper network system (that is, an example of an HFC network system). In this network system, the network device may be a cable modem termination system (CMTS), and the user equipment may be a cable modem (CM).

It should be understood that the DOCSIS standard copper network system, the CMTS, and the CM are merely examples used for description, and shall not impose any limitation on the present invention. This embodiment of the present invention is not limited thereto. In any network system in which data is sent on a downlink channel in a broadcast manner and data is transmitted on an uplink channel based on resource scheduling of a network device, the technical solutions in the present invention may be used to control a scheduling packet.

FIG. 2 is a schematic diagram of a DOCSIS standard copper network system. In a home network, customer premises equipment (CPE) in different protocol versions access a CM. For example, for CPE in Internet Protocol (IP) version 4 (v4) or CPE in an IPv6 Protocol, multiple CMs access a CMTS using HFC. The CMTS accesses a public network, and is connected to a background network, such as a network management system (NMS) or a configuration system. The CMTS may be connected to an external device using a switching forwarder, may be connected to the Internet using a router, or may be directly connected to a local server, so as to obtain a local service. The CMTS provides a data access service for a user of a cable television network, and completes functions such as modulation, demodulation, conversion, and routing of an IP packet and a data signal. Any CM needs to receive and send information by means of forwarding by the CMTS. As user equipment, the CM is placed at home of a user, and is connected to a computer of the user. The CM completes conversion between a data signal and an analog signal, and modulates and demodulates the signal, so that information can be better transmitted on the HFC network.

It should be understood that the foregoing communications system to which a method for controlling a scheduling packet in an embodiment of the present invention can be applied is merely an example for description, and the present invention is not limited thereto. Another communications system in which data is sent on a downlink channel in a broadcast manner and data is transmitted on an uplink channel based on scheduling of a network device falls within the protection scope of the present invention.

Specifically, when UE (for example, the CM) needs to transmit uplink data, the UE first needs to request a network device (for example, the CMTS) to allocate an uplink transmission resource to the UE. The UE sends an uplink transmission resource request to the network device, to request the network device to allocate an uplink transmission resource to the UE. The network device allocates the uplink transmission resource for the UE according to information such as a current channel status of an uplink channel, and sends resource allocation information of the uplink transmission resource to the UE. The UE transmits, according to the resource allocation information, uplink data by using a transmission resource (for example, a time domain resource) indicated by the resource allocation information.

Without loss of generality, in this embodiment of the present invention, a first scheduling packet is a packet that is sent by the network device to the UE in period A and that carries resource allocation information indicating a transmission resource (for example, a time domain resource) to be used when the UE performs uplink transmission in a first uplink period.

In addition, in this embodiment of the present invention, a second scheduling packet is a packet that is not sent by the network device to the UE and that carries resource allocation information indicating a transmission resource (for example, a time domain resource) to be used when the UE performs uplink transmission in a second uplink period.

A scheduling packet (including the first scheduling packet and the second scheduling packet) may include multiple information elements (IE). One IE is used to carry resource allocation information that is of uplink data and that corresponds to one uplink transmission resource request. The first scheduling packet includes an IE used to carry resource allocation information for the first uplink period, and the resource allocation information for the first uplink period indicates a transmission resource to be used by the user equipment to send uplink data in the first uplink period. The second scheduling packet includes an IE used to carry resource allocation information for the second uplink period. The resource allocation information for the second uplink period indicates a transmission resource to be used by the user equipment to send uplink data in the second uplink period.

It should be understood that the transmission resource includes a time domain resource, a frequency domain resource, or another resource. This is not limited in the present invention.

The network device determines, according to a transmission bandwidth of the first scheduling packet sent to the UE in the period A (for example, may be a period before the first uplink period), whether the transmission bandwidth of the first scheduling packet is greater than or equal to a first control threshold. The first control threshold may be a threshold used when the network device sends the second scheduling packet using a downlink channel in period B (for example, may be a period before the second uplink period and after the period A).

When the transmission bandwidth of the first scheduling packet is greater than or equal to the first control threshold, it may be further determined that, if the second scheduling packet is generated according to a quantity of IEs in the generated first scheduling packet, a downlink bandwidth occupied by the second scheduling packet in the period B (an example of duration corresponding to the second uplink period) is greater than or equal to the first control threshold. Therefore, in this embodiment of the present invention, the network device may determine a target quantity A (an example of a target quantity) according to the first control threshold. The target quantity A is less than or equal to the quantity of IEs included in the first scheduling packet. The network device generates the second scheduling packet according to the target quantity A. A quantity of IEs included in the second scheduling packet is less than the target quantity A, so that a transmission bandwidth of the second scheduling packet is less than the first control threshold.

It should be understood that the second uplink period follows the first uplink period. The second uplink period may be a next period after the first uplink period, or may be an $N^{th}$ period after the first uplink period, where N>1, and this is not limited in the present invention.

The following describes a method for determining the first control threshold in this embodiment of the present invention.

In this embodiment of the present invention, the first control threshold may be a bandwidth value, which is also referred to as a transmission rate value.

Optionally, the network device may determine the first control threshold according to a transmission bandwidth of downlink data.

The network device (for example, the CMTS) may dynamically determine the first control threshold by monitoring traffic and a bandwidth of each downlink channel. When determining that the transmission bandwidth of the downlink data that currently needs to be transmitted is relatively high, the network device sets a relatively low first control threshold (that is, a relatively low transmission rate of the second scheduling packet is obtained by means of subsequent controlling based on the first control threshold); or when determining that the transmission bandwidth of the downlink data that currently needs to be transmitted is relatively low, the network device sets a relatively high first control threshold (that is, a relatively high transmission rate of the second scheduling packet is obtained by means of subsequent controlling based on the first control threshold).

Optionally, the network device may determine the first control threshold according to a sum of the transmission bandwidth of the first scheduling packet and the transmission bandwidth of the downlink data.

The network device may determine the first control threshold according to a sum of the transmission bandwidth of the first scheduling packet and the transmission bandwidth of the downlink data that currently needs to be transmitted. When the sum of the transmission bandwidth of the first scheduling packet and the transmission bandwidth of the downlink data is relatively high, a relatively low first control threshold is set. When the sum of the transmission bandwidth of the first scheduling packet and the transmission bandwidth of the downlink data is relatively low, a relatively high first control threshold is set.

Optionally, the first control threshold may be determined according to a threshold (a usage threshold of a downlink bandwidth) of a ratio of the transmission bandwidth of the first scheduling packet to a total downlink bandwidth. That is, because a system can provide a fixed total bandwidth of the downlink channel, a threshold of the transmission bandwidth of the second scheduling packet is determined according to the total bandwidth of the downlink channel and the usage threshold.

Optionally, the network device may determine at least one preset threshold, where each preset threshold corresponds to a bandwidth range. The network device may determine the first control threshold from the preset threshold according to a bandwidth range in which the transmission bandwidth of the downlink data falls.

Optionally, the network device may determine at least one preset threshold, where each preset threshold corresponds to a bandwidth range. The network device may determine the first control threshold from the preset threshold according to a bandwidth range in which a sum of the transmission bandwidth of the first scheduling packet and the transmission bandwidth of the downlink data falls.

The network device may set multiple (or multi-level) preset thresholds, where each preset threshold corresponds to a bandwidth range, and preset thresholds correspond to different bandwidth ranges.

Therefore, for example, the network device may use, according to a bandwidth range (which is denoted as a bandwidth range A for ease of understanding and distinguishing) in which a sum of the transmission bandwidth of the first scheduling packet and the transmission bandwidth of the downlink data that currently needs to be transmitted falls, a preset threshold corresponding to the bandwidth range A as the first control threshold.

Alternatively, for another example, the network device may use, according to a bandwidth range (which is denoted as a bandwidth range B for ease of understanding and distinguishing) in which a sum of the transmission bandwidth of the downlink data that currently needs to be transmitted and the transmission bandwidth of the first scheduling packet falls, a preset threshold corresponding to the bandwidth range B as the first control threshold.

Alternatively, for another example, the network device may determine the first control threshold according to a ratio (which is also referred to as downlink bandwidth usage) of the sum of the transmission bandwidth of the downlink data that currently needs to be transmitted and the transmission bandwidth of the first scheduling packet to a total downlink bandwidth provided by a system. As an example instead of a limitation, it is assumed that the preset threshold includes a preset threshold A and a preset threshold B. The preset threshold A is greater than the preset threshold B, the preset threshold A corresponds to bandwidth usage of 80%, and the preset threshold B corresponds to bandwidth usage of 90%. Therefore, when the ratio of the sum of the transmission bandwidth of the downlink data that currently needs to be transmitted and the transmission bandwidth of the first scheduling packet to the total downlink bandwidth provided by the system is greater than or equal to 90%, the network device may select the preset threshold B as the first control threshold. When the ratio of the sum of the transmission bandwidth of the downlink data that currently needs to be transmitted and the transmission bandwidth of the first scheduling packet to the total downlink bandwidth provided by the system is greater than or equal to 80% and is less than 90%, the network device may select the preset threshold A as the first control threshold.

Optionally, alternatively, the network device may determine, with reference to a ratio of a quantity of channels on which bandwidth usage of downlink data and the first scheduling packet is less than or equal to a preset threshold to a total quantity of downlink channels, whether to use the preset threshold as the first control threshold. As an example instead of a limitation, it is assumed that a ratio D of a quantity of channels on which bandwidth usage of the first scheduling packet is less than or equal to the preset threshold A to the total quantity of downlink channels is set to 30%. When a ratio of a quantity of downlink channels on which the bandwidth usage of the first scheduling packet is less than or equal to the preset threshold A to the total quantity of downlink channels is greater than or equal to D, the preset threshold A is used as the first control threshold. For example, it is assumed that bandwidth usage that is of downlink data and the first scheduling packet and that corresponds to the preset threshold A is set to 80%, and bandwidth usage of 30% of the downlink channels is greater than or equal to the bandwidth usage of 80% corresponding to the preset threshold A. The preset threshold A is used as the first control threshold.

When determining that bandwidth usage of the first scheduling packet and downlink data is in a range of the bandwidth usage correspond to the preset threshold A, the network device needs to determine whether the transmission bandwidth of the first scheduling packet is greater than or equal to the first control threshold, that is, the preset threshold A. As an example instead of a limitation, the preset threshold A includes a preset threshold $A_1$ of a transmission bandwidth on all downlink channels and a preset threshold $A_2$ of a transmission bandwidth on a single downlink channel. When the transmission bandwidth of the first scheduling packet is greater than or equal to the preset threshold $A_1$, or when the transmission bandwidth of the first scheduling packet is greater than or equal to the preset threshold $A_2$ on a single downlink channel, sending of the second scheduling packet needs to be controlled. If the preset threshold $A_1$ of a transmission bandwidth on all downlink channels is set to 30%, and the preset threshold $A_2$ of the transmission bandwidth on the single downlink channel is 10%, when the network device determines that the transmission bandwidth of the first scheduling packet is greater than or equal to 30%, or that the transmission bandwidth of the first scheduling packet is greater than or equal to 10% on a single downlink channel, sending of the second scheduling packet needs to be controlled, so that a transmission bandwidth of the second scheduling packet is less than 30%, or a transmission bandwidth of the second scheduling packet on a single downlink channel is less than 10%.

Optionally, alternatively, the first control threshold may be determined according to a busy/idle state of a network in different periods. For example, during 0:00 to 9:00, a network is in a relatively idle state, and a relatively high first control threshold may be set, while during 9:00 to 24:00, the network is in a busy state, and a relatively low first control threshold may be set.

Optionally, alternatively, the first control threshold may be determined according to service information during registration of the CM or may be determined according to a policy used by the CMTS system to perform allocation on all CMs, and is preset to be static in the CMTS in a period.

It should be understood that the foregoing method for determining the first control threshold is merely an example for description. This is not limited in the present invention.

The following describes in detail a method for and a process of generating the second scheduling packet based on the first control threshold.

It should be understood that the resource allocation information, the IE, and the scheduling packet are merely examples for description, and shall not impose any limitation on the present invention. The present invention is not limited thereto. In different network systems, information indicating resource allocation, an information element that carries the information indicating resource allocation, and a packet that carries the information element shall fall within the protection scope of the present invention.

In the following, for ease of understanding and description, a specific execution process of the method for controlling the scheduling packet applied to the DOCSIS standard copper network system according to the embodiment of the present invention is used as example to describe in detail the method and the process of generating the second scheduling packet by the CMTS based on the first scheduling packet.

As an example instead of a limitation, in this embodiment of the present invention, the scheduling packet (including a first scheduling packet and a second scheduling packet) may be a bandwidth allocation mapping (MAP) packet. In some examples, the MAP packet may include a first MAP packet, a second MAP packet, a third MAP packet, a fourth MAP packet, and a fifth MAP packet.

In this embodiment of the present invention, the CMTS (that is, an example of the network device) may be divided into multiple uplink channels and multiple downlink channels according to different spectrums. For example, a downlink channel operates in a frequency range of 88 MHz to 860 MHz, and an uplink channel operates in a frequency range of 5 MHz to 42 MHz and at 65 MHz. Data is sent on the downlink channel in a broadcast manner, and data is sent on the uplink channel in a time division multiplexing manner. Therefore, when sending uplink data, the CM (that is, an example of the user equipment) needs to send an uplink transmission resource request to the CMTS in advance. Specifically, in this embodiment of the present invention, the CM requests, from the CMTS, an uplink time domain resource (that is, an example of the uplink transmission resource) used to transmit the uplink data. The CMTS allocates a time domain resource to the CM according to a current status of the uplink channel, divides time that is provided for the entire uplink channel to transmit information into time domain resources, and allocates these time domain resources to a CM for use.

In the following, a request for an uplink time domain resource is used as an example for description. It should be understood that the request for the uplink time domain resource is merely an example for description, and shall not impose any limitation on the present invention. The present invention is not limited thereto.

When a CM accesses a CMTS for the first time, the CM needs to register with the CMTS, so that service flow information of the CM is configured in the CMTS. The service flow information includes user information of the CM such as user equipment, user priority information, and quality of service (QoS), and includes information such as a service type of uplink data transmission that may be performed by the user. The CMTS determines an allocation policy for the CM according to the service flow information, including parameter information of bandwidth allocation for the request of the CM.

Optionally, the service flow information may be indicated by using a service identifier (SID). One SID represents one service flow, that is, uplink data transmission of a service type initiated by one CM. One CM may simultaneously initiate a request of multiple service flows, and separately use different SID values to identify service types of service flows of the request initiated by the user. It should be understood that the SID is merely an example for description, and shall not impose any limitation on the present invention. This embodiment of the present invention is not limited thereto.

It should be understood that in this embodiment of the present invention, a data transmission direction may include an uplink direction and a downlink direction. The uplink direction may represent a data transmission direction from the CMTS to the CM, and the downlink direction may represent a data transmission direction from the CM to the CMTS. Correspondingly, data transmitted in the uplink direction may be referred to as uplink data, and a channel used to transmit the uplink data is referred to as an uplink channel. Data transmitted in the downlink direction may be referred to as downlink data, and a channel used to transmit the downlink data is referred to as a downlink channel.

In a DOCSIS standard copper network system, the CM sends an uplink transmission resource request to the CMTS in a common timeslot before a current period that is allocated by the CMTS, and the CMTS allocates an uplink time domain resource to the CM according to a size or transmission duration of uplink data that needs to be transmitted by the CM and that is carried in the uplink transmission resource request. The CMTS sends resource allocation information to the CM by sending a MAP packet on a downlink channel in a broadcast manner, so that the CM can transmit uplink data in a time domain resource indicated by the resource allocation information. Each MAP packet includes multiple IEs, and each IE carries one piece of resource allocation information. That is, a quantity of IEs is a quantity of pieces of resource allocation information. In a current system, the CMTS sends a separate MAP packet on each uplink channel, and each MAP packet needs to be sent on all primary downlink channels in a broadcast manner. Therefore, each MAP packet needs to be copied on each primary downlink channel, and consequently, a large quantity of MAP packets are sent on the primary downlink channel. A schematic diagram of a MAP packet format is shown in FIG. 3. A length L of each MAP packet is:

$$L = M + n * l_{IE} \quad (1)$$

M is a quantity of bytes in a packet header in the MAP packet format, including a 19-byte Media Access Control (MAC) header in the MAP packet format and a 16-byte MAP packet header. $l_{IE}$ is a length of an IE. In a DOCSIS standard, the mapping is defined as a variable-length structure, and carries a maximum of 240 IEs. A length of each IE is four bytes. It is assumed that uplink congestion occurs, 240 IEs need to be filled each time, and a maximum length L of each MAP packet length L is 995 bytes.

An average transmission bandwidth W of a MAP packet sent on the downlink channel is:

$$W = N_{uplink} * N_{downlink} * L * a / T \quad (2)$$

$N_{uplink}$ represents a quantity of uplink channels. $N_{downlink}$ represents a quantity of primary downlink channels. a is a constant, indicating that each byte is 8 bits. T is duration of a mapping period, that is, duration of an uplink time domain resource allocated by the CMTS to the CM and indicated by resource allocation information carried in the MAP packet.

Without loss of generality, a duration in which the CMTS sends a MAP packet is the same as a duration of uplink period indicated by the MAP packet. That is, if the CMTS sends the MAP packet in a duration of 4 ms, the duration of the uplink period indicated by the MAP packet is 4 ms.

In a CMTS high-capacity scenario, it is assumed that there are 10 primary downlink channels and 8 uplink channels in a system, and access from a large quantity of CMs causes an uplink congestion scenario. A transmission bandwidth of the MAP packet is approximately 318,400,000 bytes/s by means of calculation according to a period whose duration is 2 ms.

Therefore, in the uplink congestion scenario, a transmission bandwidth of the MAP packet is 318 Mbps. However, for a DOCSIS downlink channel in a QAM 256 modulation scheme of a European-standard symbol rate of 6.952 M, a bandwidth of a single channel is only 512053 kbps, and a total bandwidth of 10 downlink channels is only 5,120,530 kbps, that is, approximately 512 Mbps. In an extreme case, the MAP packet may occupy 62% of a total downlink bandwidth, and consequently, downlink data transmission is seriously affected. Because a downlink bandwidth is affected by transmission of a MAP packet, a bandwidth available for downlink data is greatly reduced, and user experience is poor.

However, in this embodiment of the present invention, the CMTS first sends a first MAP packet on a downlink channel in a broadcast manner, and the first MAP packet is used to carry resource allocation information for uplink data to be sent in a first uplink period. After sending the first MAP packet, the CMTS determines, according to a length of the first MAP packet, and duration of a mapping period indicated in the MAP packet, an average transmission bandwidth of the first MAP packet in duration corresponding to the first mapping period. When a transmission bandwidth of the first MAP packet is greater than or equal to the first control threshold, if a period is unchanged, a length of the second MAP packet may be determined according to the first control threshold. Further, a quantity of IEs corresponding to duration of the first uplink period is calculated, and the second MAP packet is generated according to the quantity of IEs corresponding to the duration of the first uplink period, so that the length of the second MAP packet is reduced, and a transmission bandwidth of the second MAP packet is reduced.

In an embodiment, when the first control threshold is a preset threshold A, a value of $n_A$ of a target quantity A corresponding to the preset threshold A may be calculated according to formulas (1) and (2).

$$n_A = \left( \frac{A * T}{N_{uplink} * N_{downlink} * a} - M \right) \Big/ l_{IE}$$

Because the transmission bandwidth of the first MAP packet is greater than or equal to the first control threshold, the target quantity A corresponding to the first control threshold is less than or equal to a quantity of IEs included in the first MAP packet. The CMTS determines, according to the target quantity A, a quantity of IEs included in the second MAP packet. The quantity of IEs included in the second MAP packet is less than the target quantity A, so that the transmission bandwidth of the second MAP packet is less than the first control threshold.

Optionally, the CMTS may perform, according to registration information used when a CM that sends a request accesses the CMTS for the first time, and according to information such as user priority or QoS attribute, delay processing on a request sent by a CM that has relatively low priority or that has relatively low QoS attribute, and may preferentially allocate an IE that indicates uplink time domain resource allocation information to a CM that has high priority or that has a high QoS attribute value.

Therefore, in this embodiment of the present invention, when the transmission bandwidth of the first scheduling packet is greater than or equal to the first control threshold, the target quantity of the IEs is determined according to the first control threshold. The second scheduling packet is generated according to the target quantity, and the transmission bandwidth of the second scheduling packet is controlled, so that the transmission bandwidth of the second scheduling packet is less than the first control threshold. Therefore, downlink data transmission is less affected by the second scheduling packet, and downlink bandwidth usage is improved.

It should be understood that the uplink transmission resource request includes a request for an uplink time domain resource, a request for an uplink frequency domain resource, and a request for another uplink resource. This is not limited in the present invention.

Optionally, as shown in FIG. 4, a process of generating a second scheduling packet includes the following steps.

S131. Allocate one target IE to at least two uplink transmission resource requests, where the target IE is used to carry resource allocation information that is of uplink data and that corresponds to the at least two uplink transmission resource requests, the at least two uplink transmission resource requests are from same user equipment, and services corresponding to the at least two uplink transmission resource requests have a same service type.

S132. Generate the second scheduling packet including the target IE.

When services that are sent by UE and that require uplink data transmission belong to a same service type, and two or more uplink transmission resource requests of the service are sent by the UE, a network device allocates a transmission resource to the two or more uplink transmission resource requests. The transmission resource is a sum of the transmission resource allocated to the two or more uplink transmission resource requests, and resource allocation information is carried in a target IE. Therefore, a quantity of IEs is further reduced.

Therefore, in this embodiment of the present invention, one target IE is allocated to the at least two uplink transmission resource requests to indicate the resource allocation information, so that the quantity of IEs is reduced, a length of the second scheduling packet is reduced, and a transmission bandwidth of the second scheduling packet is reduced. In addition, a quantity of resources allocated for a single uplink transmission of a single service flow increases, overheads on uplink and downlink channels are reduced, waste of network resources is reduced, the uplink bandwidth usage and the downlink bandwidth usage are improved, efficiency of controlling a scheduling packet is improved, and system performance is improved.

Optionally, the network device may allocate one target IE to at least two uplink transmission resource requests that carry a same service identifier, and a service identifier is used to uniquely indicate user equipment and a service type. The network device allocates one target IE according to a service identifier carried in the multiple uplink transmission resource requests.

In the following, for ease of understanding and description, a specific execution process of a method for controlling a scheduling packet applied to a DOCSIS standard copper network system according to the embodiment of the present invention is used as example to describe in detail a method for and a process of allocating one target IE to at least two uplink transmission resource requests and generating a second scheduling packet.

Without loss of generality, in this embodiment of the present invention, when sending a MAP packet, the CMTS needs to indicate allocation information of a time domain resource to each service flow by using an IE. A schematic diagram of an IE format is shown in FIG. 5. Each IE includes one SID, and an uplink transmission resource request of each service flow also includes one SID. When the SID in the uplink transmission resource request is the same as the SID in the IE, resource allocation information carried in the IE is resource allocation information for the uplink transmission resource request. When a MAP packet is sent on a downlink channel in a broadcast manner, the CM receives, according to an uplink channel identifier (ID) in the MAP packet, a MAP packet that indicates an allocation relationship of an uplink time domain resource for the CM. The CM parses the received MAP packet, determines, according to the SID, an IE allocated to the CM, and discards another IE. Time offset in the IE indicates a start transmission time and transmission duration that are of uplink data and that are corresponding to an uplink transmission resource request. A timeslot type (for example: an interval usage code, IUC) in the IE indicates a type of timeslot indicated in the IE. For example, when SID=0 and IUC=7, it indicates that a list ends, the IE is an empty IE, and a next IE indicates allocation information of an uplink time domain resource of a next service flow.

The CMTS may allocate, according to the SID carried in the uplink transmission resource request, one target IE to at least two uplink transmission resource requests that carry a same SID. One SID uniquely indicates user equipment and a service type of uplink data requested to be transmitted by the user equipment.

For example, two uplink transmission resource requests (such as a request 1 and a request 2) that carry a same SID (for example, a SID 1) are sent for a service flow of one CM. Transmission of uplink data corresponding to the request 1 requires transmission duration of 0.2 ms, and transmission of uplink data corresponding to the request 2 requires transmission duration of 0.8 ms.

In the current system, it is assumed that a current period is 2 ms, the CMTS separately performs bandwidth allocation for the request 1 and the request 2 in a MAP packet according to an order of the requests, and allocates uplink time resources twice by using two IE: duration of 0.2 ms and duration of 0.8 ms.

In this embodiment of the present invention, the CMTS allocates a time domain resource to the CM according to sending duration of uplink data corresponding to the request 1 and sending duration of uplink data corresponding to the request 2. The duration of the time domain resource is 1 ms, and is carried in one target IE. Therefore, one target IE is allocated to multiple uplink transmission resource requests that carry a same SID, so that a quantity of IEs is reduced.

In addition, the CM correspondingly sends uplink data by performing fragmentation for multiple times according to a quantity of received IEs. A fragment header is generated each time when fragmentation is performed, and consequently, a waste of overhead is caused. Therefore, when one target IE carries resource allocation information that is of uplink data and that is corresponding to multiple uplink transmission resource requests, a quantity of times of uplink data fragmentation may be reduced, and a quantity of fragment headers is reduced, so that overheads are reduced.

Therefore, in this embodiment of the present invention, one target IE is allocated to uplink transmission resource requests that have a same service identifier to indicate resource allocation information, so that a quantity of IEs is reduced, a length of a second scheduling packet is reduced, a transmission bandwidth of the second scheduling packet is reduced, and fewer downlink time domain resources are required. In addition, a quantity of time domain resources allocated for a single uplink transmission of a single service flow increases, overheads on uplink and downlink channels are reduced, waste of network resources is reduced, the uplink bandwidth usage and the downlink bandwidth usage are improved, efficiency of controlling a scheduling packet is improved, and system performance is improved.

It should be understood that the SID is used as a service identifier and is merely an example for description, and shall not impose any limitation on the present invention. The present invention is not limited thereto.

Optionally, duration of a second uplink period is greater than duration of a first uplink period.

When determining that the transmission bandwidth of the first scheduling packet is greater than or equal to a first control threshold, the network device may further redetermine the duration of the second uplink period while reducing a quantity of IEs, so that the duration of the second uplink period indicated by the resource allocation information and carried by the second scheduling packet is greater than the duration of the first uplink period.

The network device may determine the duration of the second uplink period according to the duration of the first uplink period, so that the duration of the second uplink period is greater than the duration of the first uplink period. Resource allocation information for the duration of the second uplink period is carried in the second scheduling packet, and the duration is changed by changing time offset of the IE.

As an example instead of a limitation, in this embodiment of the present invention, the CMTS may determine the duration of the second uplink period with reference to maximum and minimum values of a mapping period set by a system for an uplink channel and according to the duration of the first uplink period, so that the duration of the second uplink period is greater than the duration of the first uplink period, and is less than the maximum value of the mapping period. For example, the duration of the first uplink period is 2 ms, and the mapping period set by the system has a maximum value of 10 ms, and a minimum value of 1 ms. Therefore, it may be determined that the duration of the second uplink period is any value greater than 2 ms and less than 10 ms. Optionally, the duration of the second uplink period may be exponentially extended according to the duration of the first uplink period. For example, when the duration of the first uplink period is 2 ms, the duration of the second uplink period is 4 ms, and the duration of the second uplink period is indicated using resource allocation information carried in the IE of the second MAP packet.

Because a sending period of the second MAP packet is prolonged, a time domain resource allocated in each period increases, and a time domain resource of a next period allocated to each service flow of each CM increases. For example, a first uplink period is 2 ms, a second uplink period is 4 ms, and a time domain resource allocated to a second uplink period of a service flow of the CM is 4 ms. If uplink data transmission of a CM requires 2 s, a quantity of times of sending a MAP packet by the CMTS to the CM decreases from 1000 times of sending the first MAP packet to 500 times of sending the second MAP packet, so that a quantity of fragment headers of the second MAP packet is reduced each time when the second MAP packet is sent. Serial numbers of fragment headers are used to reassemble the MAP packet after the MAP packet is received. In DOCSIS standard version 2.0, a fragment header occupies 6 bytes, and in DOCSIS standard version 3.0, a fragment header occupies 8 bytes. Therefore, when the quantity of times of sending the MAP packet decreases by 500 times, overheads of 10,000 bytes or 1600 bytes are reduced. For a packet sent on all primary downlink channels, for example, 10 primary channels in a broadcast manner, overheads of 16,000 bytes are reduced. In addition, each MAP packet needs to be encapsulated in a sending process, a MAC header in the MAP packet format occupies 19 bytes, and a frame header of a Moving Picture Experts Group (MPEG) occupies 5 bytes, so that overheads of 120,000 bytes are reduced. In addition, a time domain resource of each period allocated to each service flow of each CM increases, so that a quantity of fragments of uplink data is reduced, and overheads of fragment headers on the uplink data are reduced.

Therefore, in this embodiment of the present invention, the duration of the second uplink period is determined while a quantity of IEs is reduced, so that the duration of the second uplink period is greater than the duration of the first uplink period. In addition, a quantity of time domain resources allocated for a single uplink transmission of a single service flow increases, overheads on uplink and downlink channels are reduced, waste of network resources is reduced, the uplink bandwidth usage and the downlink bandwidth usage are improved, efficiency of controlling a scheduling packet is improved, and system performance is improved.

Optionally, after the second scheduling packet is sent, a preset threshold of a transmission bandwidth of the second scheduling packet or a transmission bandwidth of downlink data may be further determined, and a second control threshold is determined. When the transmission bandwidth of the second scheduling packet is greater than or equal to the second control threshold, a target quantity B (another example of the target quantity) is determined according to the second control threshold, and a third scheduling packet is generated according to the target quantity B, so that a quantity of IEs included in the third scheduling packet is less than the target quantity B, and is greater than the target quantity A. The second control threshold is less than the first control threshold, and the target quantity B is less than the target quantity A. The IEs included in the third scheduling packet are used to carry resource allocation information for a third uplink period, the resource allocation information for the third uplink period instructs user equipment to send uplink data in the third uplink period, and the third uplink period follows the second uplink period.

It should be understood that the third uplink period follows the second uplink period. The third uplink period may be a next period after the second uplink period, or may be an $N^{th}$ period after the second uplink period, where N>1. This is not limited in the present invention.

Because a network device monitors a downlink channel in real time, when generating a second scheduling packet according to the first control threshold, and after sending the second scheduling packet, the network device needs to determine the transmission bandwidth of the second scheduling packet, so that downlink data transmission is less affected by a scheduling packet during subsequent downlink transmission of the network device.

Because a transmission volume of the downlink data dynamically changes, considering that a period changes, the preset threshold corresponding to the transmission bandwidth of the second scheduling packet or the transmission bandwidth of the downlink data may change, and the corresponding control threshold changes accordingly. When the transmission bandwidth of the second scheduling packet is greater than or equal to the second control threshold, the network device may determine the target quantity B according to the second control threshold, and generate the third scheduling packet according to the target quantity B, so that a quantity of IEs included in the third scheduling packet is less than the target quantity B. The IEs included in the third scheduling packet are used to carry resource allocation information for the third uplink period, the resource allocation information for the third uplink period instructs the user equipment to send uplink data in the third uplink period, and the third uplink period follows the second uplink period.

It should be understood that in this embodiment of the present invention, a method for and a process of determining the second control threshold is the same as the method and the process of determining the first control threshold. Details are not described herein again.

In the following, the DOCSIS standard copper network system is used as an example to describe in detail a method for and a process of determining the target quantity A based on the first control threshold and generating the second scheduling packet, determining target quantity B based on the second control threshold, and generating the third scheduling packet.

It should be understood that the DOCSIS standard copper network system is merely an example for description, and shall not impose any limitation on the present invention. This embodiment of the present invention is not limited thereto.

In this embodiment of the present invention, the CMTS (that is, an example of the network device) may determine a corresponding bandwidth range by determining bandwidth usage of the first MAP packet and downlink data, and may further determine the first control threshold according to a mapping relationship between a bandwidth range and a preset threshold. As an example instead of a limitation, it is assumed that the preset threshold includes a preset threshold A and a preset threshold B. The preset threshold A is greater than the preset threshold B, the preset threshold A corresponds to bandwidth usage of 80%, and the preset threshold B corresponds to bandwidth usage of 90%. Therefore, when a ratio of a sum of a transmission bandwidth of downlink data that currently needs to be transmitted and a transmission bandwidth of the first MAP packet to a total downlink bandwidth provided by a system is greater than 90%, the CMTS may select the preset threshold B as the first control threshold. When a ratio of a sum of a transmission bandwidth of downlink data that currently needs to be transmitted and a transmission bandwidth of the first MAP packet to a total downlink bandwidth provided by a system is greater than 80% and is less than 90%, the CMTS may select the preset threshold A as the first control threshold.

Optionally, alternatively, the CMTS may determine, with reference to a ratio of a quantity of channels on which bandwidth usage of downlink data and the first MAP packet is less than or equal to a preset threshold to a total quantity of downlink channels, whether to use the preset threshold as the first control threshold. As an example instead of a limitation, it is assumed that a ratio D of a quantity of channels on which bandwidth usage of the first MAP packet is less than or equal to the preset threshold A to the total quantity of downlink channels is set to D. When a ratio of a quantity of downlink channels on which the bandwidth usage of the first MAP packet is less than or equal to the preset threshold A to the total quantity of downlink channels is greater than or equal to D, the preset threshold A is used as the first control threshold. For example, it is assumed that bandwidth usage that is of downlink data and the first MAP packet and that correspond to the preset threshold A is set to 80%, and bandwidth usage of 30% of the downlink channels is greater than or equal to the bandwidth usage of 80% corresponding to the preset threshold A. The preset threshold A is used as the first control threshold.

When determining that bandwidth usage of the first MAP packet and downlink data is in a range of the bandwidth usage corresponding to the preset threshold A, the CMTS needs to determine whether the transmission bandwidth of the first MAP packet is greater than or equal to the first control threshold, that is, the preset threshold A. As an example instead of a limitation, the preset threshold A includes a preset threshold $A_1$ of a transmission bandwidth on all downlink channels and a preset threshold $A_2$ of a transmission bandwidth on a single downlink channel. When the transmission bandwidth of the first MAP packet is greater than or equal to the preset threshold $A_1$, or when the transmission bandwidth of the first MAP packet is greater than or equal to the preset threshold $A_2$ on a single downlink channel, sending of the second MAP packet needs to be controlled. If the preset threshold $A_1$ of a transmission bandwidth on all downlink channels is 30%, and the preset threshold $A_2$ of the transmission bandwidth on the single downlink channel is 10%, when the CMTS determines that the transmission bandwidth of the first MAP packet is greater than or equal to 30%, or that the transmission bandwidth of the first MAP packet is greater than or equal to 10% on a single downlink channel, sending of the second MAP packet needs to be controlled.

As an example instead of a limitation, the CMTS controls sending of the second MAP packet by using a level 1 processing policy. In an embodiment, the CMTS determines the target quantity A according to the preset threshold A, and generates the second MAP packet. A quantity of IEs included in the second MAP packet is less than the target quantity A, and duration of an uplink transmission resource indicated by resource allocation information in the IEs of the second MAP packet is prolonged. For example, a quantity of IEs in the first MAP packet is 240, so that the target quantity A is determined as 125 according to a preset threshold $B_1$ 30%, and the second MAP packet is generated according to the target quantity A. A quantity of IEs included in the second MAP packet is 120, and duration of an uplink transmission resource indicated by resource allocation information in the IEs of the second MAP packet is prolonged from 2 ms to 2.5 ms. Further, the second MAP packet is generated. If only a transmission bandwidth of the first MAP packet on a single downlink channel is in a bandwidth range corresponding to the first control threshold of a channel, only sending of the second MAP packet on the channel is controlled. The target quantity A on the channel is determined, so that the second MAP packet is generated, and a ratio of a transmission bandwidth of the second MAP packet on the channel to a total bandwidth of the channel is less than 10%.

The CMTS generates and sends the second MAP packet according to the first control threshold. The CMTS further determines bandwidth usage of the second MAP packet and downlink data, determines a corresponding bandwidth range. The CMTS further determines the second control threshold according to the mapping relationship between the bandwidth range and the preset threshold. When the CMTS determines that bandwidth usage of the second MAP packet and downlink data is greater than 90%, the CMTS may select the preset threshold B as the second control threshold.

Optionally, alternatively, the CMTS may determine, with reference to a ratio of a quantity of channels on which bandwidth usage of downlink data and the second MAP packet is less than or equal to a preset threshold at each level to a total quantity of downlink channels, whether to use the preset threshold as the second control threshold. As an example instead of a limitation, it is assumed that a ratio of a quantity of channels on which bandwidth usage of the second MAP packet is less than or equal to the preset threshold B to the total quantity of downlink channels is set to D. When a ratio of a quantity of downlink channels on which the bandwidth usage of the second MAP packet is less than or equal to the preset threshold B to the total quantity of downlink channels is greater than or equal to D, the preset threshold B is used as the second control threshold. For example, it is assumed that bandwidth usage that is of downlink data and the second MAP packet and that is corresponding to the preset threshold B is set to 90%, and bandwidth usage of 30% of the downlink channels is greater than or equal to the bandwidth usage 90% corresponding to the preset threshold B. The preset threshold B is used as the second control threshold.

When determining that bandwidth usage of the second MAP packet and downlink data is in a range of the bandwidth usage corresponding to the preset threshold B, the CMTS needs to determine whether the transmission bandwidth of the second MAP packet is greater than or equal to the second control threshold, that is, the preset threshold B. As an example instead of a limitation, the preset threshold B includes a preset threshold $B_1$ of a transmission bandwidth on all downlink channels and a preset threshold $B_2$ of a transmission bandwidth on a single downlink channel. When the transmission bandwidth of the second MAP packet is greater than or equal to the preset threshold $B_1$, or when the transmission bandwidth of the second MAP packet is greater than or equal to the preset threshold $B_2$ on a single downlink channel, sending of the third MAP packet needs to be controlled. If the preset threshold $B_1$ of a transmission bandwidth on all downlink channels is 20%, and the preset threshold $B_2$ of the transmission bandwidth on the single downlink channel is 5%, when the CMTS determines that the transmission bandwidth of the second MAP packet is greater than or equal to 20%, or that the transmission bandwidth of the second MAP packet is greater than or equal to 5% on a single downlink channel, sending of the third MAP packet needs to be controlled.

As an example instead of a limitation, the CMTS controls sending of the third MAP packet by using a level 2 processing policy. Specifically, the CMTS determines the target quantity B according to the preset threshold B, and generates the third MAP packet. A quantity of IEs included in the third MAP packet is less than the target quantity B, and a duration of an uplink transmission resource indicated by resource allocation information in the IEs of the third MAP packet is prolonged. For example, a quantity of IEs in the second MAP packet is 120, so that the target quantity B is determined as 70 according to a preset threshold $B_1$ 20%, the quantity of IEs is reduced and is 60, the transmission bandwidth of the second MAP packet is less than 20%, and a duration of an uplink transmission resource indicated by resource allocation information in the IEs of the third MAP packet is further prolonged from 2.5 ms to 3 ms. Further, one target IE is allocated to the at least two uplink transmission resource requests that carry a same SID to carry resource allocation information that is of uplink data and that corresponds to at least two uplink transmission resource requests, so that a quantity of IEs is further reduced, and the third MAP packet is further generated. If only a transmission bandwidth of the second MAP packet on a single downlink channel is in a bandwidth range corresponding to the second control threshold of a channel, only sending of the third MAP packet on the channel is controlled, so that the third MAP packet is generated, and a ratio of a transmission bandwidth of the third MAP packet on the channel to a total bandwidth of the channel is less than 5%.

Optionally, in this embodiment of the present invention, sending of the third MAP packet is controlled based on the second control threshold, so that the transmission bandwidth of the third MAP packet can be reduced. In addition, the network device monitors bandwidth usage of a downlink channel in real time, when a preset threshold corresponding to a bandwidth range in which a sum of the transmission bandwidth of the third MAP packet and a transmission bandwidth of the downlink channel falls is restored to the preset threshold A, sending of a fourth MAP packet may be further restored to be controlled by using a level 1 processing policy, to improve bandwidth usage of an uplink channel. IEs included in the fourth MAP packet are used to carry resource allocation information for a fourth uplink period, and the resource allocation information for the fourth uplink period is used to instruct user equipment to send uplink data in the fourth uplink period.

Optionally, when a preset threshold corresponding to a bandwidth range in which a sum of the transmission bandwidth of the fourth MAP packet and a transmission bandwidth of the downlink channel falls is a restoration threshold, sending of a fifth MAP packet is not controlled. In a current system, the fifth MAP packet is sent, IEs included in the fifth MAP packet are used to carry resource allocation information for a fifth uplink period, and the resource allocation information for the fifth uplink period instructs user equipment to send uplink data in the fifth uplink period.

It should be understood that the first MAP packet, the second MAP packet, the third MAP packet, the fourth MAP packet, and the fifth MAP packet are used as scheduling packets, and are all examples for description. The second MAP packet is a MAP packet sent after the first MAP packet, the third MAP packet is a MAP packet sent after the second MAP packet, the fourth MAP packet is a MAP packet sent after the third MAP packet, and the fifth MAP packet is a MAP packet sent after the fourth MAP packet. The first MAP packet, the second MAP packet, the third MAP packet, the fourth MAP packet, and the fifth MAP packet shall not impose any limitation on the present invention. The present invention is not limited thereto.

It should be further understood that the first control threshold and the second control threshold represents control thresholds corresponding to different MAP packets in periods corresponding to different mapping periods, are merely examples for description, and shall not impose any limitation on the present invention. The present invention is not limited thereto.

Therefore, in this embodiment of the present invention, the downlink channel is monitored in real time, so that a quantity of IEs included in the scheduling packet and a quantity of transmission resources allocated for a single transmission are dramatically adjusted, to improve uplink bandwidth usage. The uplink bandwidth usage is improved while a lower downlink bandwidth is used by a scheduling packet, so that a balance is achieved between the uplink bandwidth usage and downlink bandwidth usage, and system performance is improved.

It should be understood that sequence numbers of the processes do not mean execution sequences in the embodiments of the present invention. The execution sequences of the processes should be determined according to functions and an internal logical relationship between the processes, and shall not impose any limitation on the implementation processes of the embodiments of the present invention.

The foregoing has described in detail, with reference to FIG. 1 to FIG. 5, the method 100 in the embodiments of the present invention. The following describes in detail, with reference to FIG. 6 and FIG. 7, an apparatus 500 and a device 700 for controlling a scheduling packet in the embodiments of the present invention.

Figure 6:
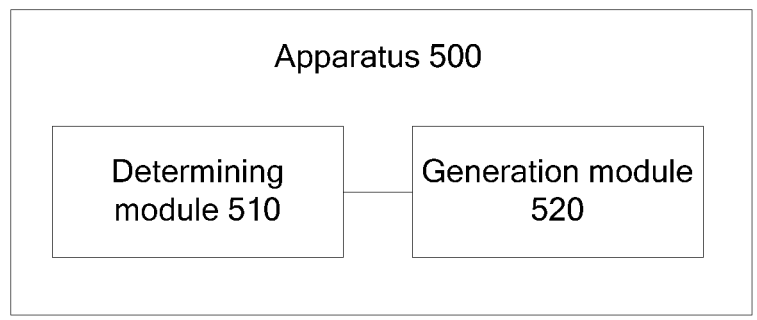
FIG. 6 is a schematic block diagram of an apparatus for controlling a scheduling packet according to an embodiment of the present invention.

FIG. 6 shows an apparatus 500 for controlling a scheduling packet according to an embodiment of the present invention. The apparatus 500 is applied to an HFC network system. As shown in FIG. 6, the apparatus 500 includes a determining module 510 and a generation module 520.

The determining module 510 is configured to determine a transmission bandwidth of a first scheduling packet, where the first scheduling packet includes an information element IE used to carry resource allocation information for a first uplink period, and the resource allocation information for the first uplink period is used to indicate a transmission resource to be used by user equipment to send uplink data in the first uplink period. The determining module 510 is also configured to determine a target quantity according to a first control threshold when the determining module 510 determines that the transmission bandwidth of the first scheduling packet is greater than or equal to the first control threshold, where the target quantity is less than or equal to a quantity of IEs included in the first scheduling packet.

The generation module 520 is configured to generate a second scheduling packet according to the target quantity determined by the determining module 510. The second scheduling packet includes an IE used to carry resource allocation information for a second uplink period. The resource allocation information for the second uplink period is used to indicate a transmission resource to be used by the user equipment to send uplink data in the second uplink period. A quantity of IEs included in the second scheduling packet is less than the target quantity. The second uplink period follows the first uplink period.

Therefore, the apparatus in this embodiment of the present invention determines the target quantity according to the first control threshold when determining that the transmission bandwidth of the first scheduling packet is greater than or equal to the first control threshold, where the target quantity is less than or equal to the quantity of IEs included in the first scheduling packet. The apparatus generates the second scheduling packet according to the target quantity, where the quantity of IEs included in the second scheduling packet is less than the target quantity, so that the transmission bandwidth of the second scheduling packet is reduced. Therefore, downlink data transmission is less affected by the second scheduling packet, and downlink bandwidth usage is improved.

Optionally, the determining module 510 is further configured to allocate one target IE to at least two uplink transmission resource requests, where the target IE is used to carry resource allocation information that is of uplink data and that is corresponding to the at least two uplink transmission resource requests, the at least two uplink transmission resource requests are from same user equipment, and services corresponding to the at least two uplink transmission resource requests have a same service type.

The generation module 520 is further configured to generate the second scheduling packet including the target IE.

Optionally, the determining module 510 is further configured to allocate one target IE to at least two uplink transmission resource requests that carry a same service identifier, and a service identifier is used to uniquely indicate user equipment and a service type.

Therefore, the apparatus in this embodiment of the present invention allocates the target IE to the at least two uplink transmission resource requests that carry a same service identifier, so as to indicate the resource allocation information, so that a quantity of IEs is reduced, a length of the second scheduling packet is reduced, and a transmission bandwidth of the second scheduling packet is reduced. In addition, a quantity of time domain resources allocated for a single uplink transmission of a single service flow increases, overheads on uplink and downlink channels are reduced, waste of network resources is reduced, the uplink bandwidth usage and the downlink bandwidth usage are improved, efficiency of controlling a scheduling packet is improved, and system performance is improved.

Optionally, duration of the second uplink period is greater than duration of the first uplink period.

Therefore, the apparatus in this embodiment of the present invention determines the duration of the second uplink period while reducing a quantity of IEs, so that the duration of the second uplink period is greater than the duration of the first uplink period. Therefore, a quantity of time domain resources allocated for a single uplink transmission of a single service flow increases, overheads on uplink and downlink channels are reduced, waste of network resources is reduced, the uplink bandwidth usage and the downlink bandwidth usage are improved, efficiency of controlling a scheduling packet is improved, and system performance is improved.

Optionally, the determining module 510 is further configured to determine the first control threshold according to a transmission bandwidth of downlink data.

Optionally, the determining module 510 is further configured to determine at least one preset threshold, and each preset threshold is corresponding to a bandwidth range.

The determining module 510 is further configured to determine the first control threshold from the at least one preset threshold according to a bandwidth range in which a sum of the transmission bandwidth of the first scheduling packet and the transmission bandwidth of the downlink data falls.

Therefore, the apparatus in this embodiment of the present invention determines the first control threshold according to the transmission bandwidth of the first scheduling packet and the transmission bandwidth of the downlink data, determines the target quantity according to the first control threshold when the transmission bandwidth of the first scheduling packet is greater than or equal to the first control threshold, and generates the second scheduling packet according to the target quantity, so that the transmission bandwidth of the second scheduling packet is reduced. Therefore, downlink data transmission is less affected by the second scheduling packet, and downlink bandwidth usage is improved.

The apparatus 500 for controlling a scheduling packet according to the embodiment of the present invention may be corresponding to the network device in the method 100 in the embodiments of the present invention, and the foregoing and other operations and/or functions of the modules in the apparatus 500 for controlling a scheduling packet are respectively intended to implement the corresponding procedures of the method 100 in FIG. 2 to FIG. 5. For brevity, details are not described herein again.

Optionally, the apparatus 500 may be a cable modem termination system, the user equipment may be a cable modem, and the scheduling packet may be a MAP packet.

Figure 7:
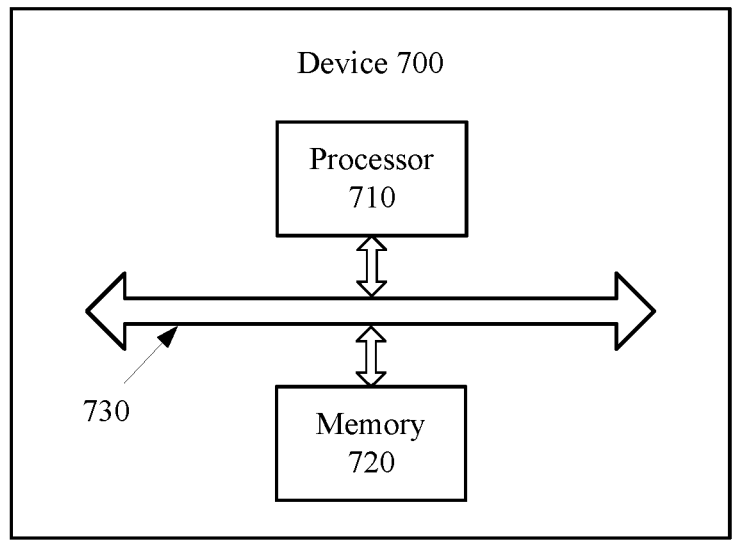
FIG. 7 is a schematic block diagram of a device for controlling a scheduling packet according to an embodiment of the present invention.

FIG. 7 is a schematic block diagram of a device 700 for controlling a scheduling packet according to an embodiment of the present invention. The device 700 is applied to an HFC network system. As shown in FIG. 7, the device 700 includes a processor 710, a memory 720, a bus system 730, and a transmitter 740. The processor 710 and the memory 720 are connected to each other by using the bus system 730. The memory 720 is configured to store an instruction. The processor 710 is configured to execute the instruction stored by the memory 720.

The processor 710 is configured to: determine a transmission bandwidth of a first scheduling packet. The first scheduling packet includes an information element (IE) used to carry resource allocation information for a first uplink period, and the resource allocation information for the first uplink period is indicates a transmission resource to be used by user equipment to send uplink data in the first uplink period. The processor 710 is further configured to determine a target quantity according to a first control threshold when the processor 710 determines that the transmission bandwidth of the first scheduling packet is greater than or equal to the first control threshold. The target quantity is less than or equal to a quantity of IEs included in the first scheduling packet. The processor 710 is further configured to generate a second scheduling packet according to the target quantity determined by the processor 710, where the second scheduling packet includes an IE used to carry resource allocation information for a second uplink period, the resource allocation information for the second uplink period is used to indicate a transmission resource to be used by the user equipment to send uplink data in the second uplink period, a quantity of IEs included in the second scheduling packet is less than the target quantity, and the second uplink period follows the first uplink period.

Therefore, the apparatus in this embodiment of the present invention determines the quantity of IEs included in the second scheduling packet according to the first control threshold when determining that the transmission bandwidth of the first scheduling packet is greater than or equal to the first control threshold, so that the transmission bandwidth of the second scheduling packet is reduced. Therefore, downlink data transmission is less affected by the second scheduling packet, and downlink bandwidth usage is improved.

It should be understood that in this embodiment of the present invention, the processor 710 may be a central processing unit (CPU), or the processor 710 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory 720 may include a read-only memory and a random access memory, and provides an instruction and data for the processor 710. A part of the memory 720 may further include a nonvolatile random access memory. For example, the memory 720 may further store information about a device type.

In addition to a data bus, the bus system 730 may further include a power bus, a control bus, a status signal bus, and the like. However, for clarity of description, various buses are marked as the bus system 730 in the figure.

During implementation, steps in the foregoing methods may be completed by using an integrated logic circuit of hardware or an instruction in a software form in the processor 710. Steps of the methods disclosed with reference to the embodiments of the present invention may be directly executed and completely by using a hardware processor, or may be executed and completely by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory 720. The processor 710 reads information in the memory 720, and completes the steps of the foregoing methods with reference to the hardware of the processor. To avoid repetition, details are not described herein.

Optionally, in an embodiment, the processor 710 is further configured to: allocate one target IE to at least two uplink transmission resource requests, where the target IE is used to carry resource allocation information that is of uplink data and that is corresponding to the at least two uplink transmission resource requests, the at least two uplink transmission resource requests are from same user equipment, and services corresponding to the at least two uplink transmission resource requests have a same service type; and generate a second scheduling packet including the target IE.

Optionally, in an embodiment, the processor 710 is further configured to allocate one target IE to at least two uplink transmission resource requests that carry a same service identifier, and a service identifier is used to uniquely indicate user equipment and a service type.

Optionally, in an embodiment, duration of the second uplink period is greater than duration of the first uplink period.

Optionally, in an embodiment, the processor 710 is further configured to determine the first control threshold according to a transmission bandwidth of downlink data.

Optionally, in an embodiment, the processor 710 may be further configured to: determine at least one preset threshold, where each preset threshold corresponds to a bandwidth range. The processor 710 is further configured to determine the first control threshold from the at least one preset threshold according to a bandwidth range in which a sum of the transmission bandwidth of the first scheduling packet and the transmission bandwidth of the downlink data falls.

Optionally, the device 700 may be a cable modem termination system, the user equipment may be a cable modem, and the scheduling packet may be a bandwidth allocation mapping packet.

It should be understood that the device 700 in this embodiment of the present invention may be corresponding to the apparatus 500 in the embodiments of the present invention, and the foregoing and other operations and/or functions of the modules in the device 700 are respectively used for implementing the corresponding procedures of the method 100 in FIG. 2 to FIG. 5. For brevity, details are not described herein.

Therefore, the apparatus in this embodiment of the present invention determines the target quantity according to the first control threshold when determining that the transmission bandwidth of the first scheduling packet is greater than or equal to the first control threshold, where the target quantity is less than or equal to the quantity of IEs included in the first scheduling packet. The apparatus generates the second scheduling packet according to the target quantity, where the quantity of IEs included in the second scheduling packet is less than the target quantity, so that the transmission bandwidth of the second scheduling packet is reduced in a manner of performing combination processing on requests that have a same service identifier, or extending a period, fewer downlink time domain resources are occupied, and downlink bandwidth usage is improved. In addition, a quantity of time domain resources allocated for a single uplink transmission of a single service flow increases, overheads are reduced, uplink bandwidth usage is improved, waste of network resources is reduced, and system performance is improved.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method, comprising:
   determining, by a network device in a hybrid fiber-coaxial network system, a transmission bandwidth of a first scheduling packet, wherein the first scheduling packet comprises a first information element (IE) that carries resource allocation information for a first uplink period, and the resource allocation information for the first uplink period indicates a transmission resource to be used by user equipment to send uplink data in the first uplink period;
   determining a first control threshold according to a transmission bandwidth of downlink data, wherein determining the first control threshold according to the transmission bandwidth of the downlink data comprises:
      determining one or more preset thresholds, wherein each of the one or more preset thresholds corresponds to a respective bandwidth range of one or more bandwidth ranges; and
      determining the first control threshold from the one or more preset thresholds according to a first bandwidth range of the one or more bandwidth ranges, wherein a sum of the transmission bandwidth of the first scheduling packet and the transmission bandwidth of the downlink data falls in the first bandwidth range;
   when the transmission bandwidth of the first scheduling packet is greater than or equal to the first control threshold, determining, by the network device, a target quantity according to the first control threshold, wherein the target quantity is less than or equal to a first quantity of IEs comprised in the first scheduling packet; and
   generating, by the network device, a second scheduling packet according to the target quantity, wherein the second scheduling packet comprises a second IE that carries resource allocation information for a second uplink period, the resource allocation information for the second uplink period indicates a transmission resource to be used by the user equipment to send uplink data in the second uplink period, a second quantity of IEs comprised in the second scheduling packet is less than the target quantity, and the second uplink period follows the first uplink period.

2. The method according to claim 1, wherein generating the second scheduling packet comprises:
   allocating one target IE to a plurality of uplink transmission resource requests, wherein the target IE carries resource allocation information of uplink data that corresponds to the plurality of uplink transmission resource requests, the plurality of uplink transmission resource requests are from same user equipment, and services corresponding to the plurality of uplink transmission resource requests have a same service type; and
   generating the second scheduling packet comprising the target IE.

3. The method according to claim 2, wherein allocating the one target IE to the plurality of uplink transmission resource requests comprises:
   allocating one target IE to the plurality of uplink transmission resource requests that carry a same service identifier, wherein the service identifier uniquely indicates the user equipment and the service type.

4. The method according to claim 1, wherein a duration of the second uplink period is greater than a duration of the first uplink period.

5. The method according to claim 1, wherein the network device is a cable modem termination system, the user equipment is a cable modem, and the first scheduling packet is a bandwidth allocation mapping packet.

6. An apparatus, comprising:
a processor; and
a non-transitory computer-readable storage medium storing a program to be executed by the processor, the program including instructions for:
determining a transmission bandwidth of a first scheduling packet, wherein the first scheduling packet comprises a first information element (IE) that carries resource allocation information for a first uplink period, and the resource allocation information for the first uplink period indicates a transmission resource to be used by user equipment to send uplink data in the first uplink period;
determining a first control threshold according to a transmission bandwidth of downlink data, wherein determining the first control threshold according to the transmission bandwidth of the downlink data comprises:
determining one or more preset thresholds, wherein each of the one or more preset thresholds corresponds to a respective bandwidth range of one or more bandwidth ranges; and
determining the first control threshold from the one or more preset thresholds according to a first bandwidth range of the one or more bandwidth ranges, wherein a sum of the transmission bandwidth of the first scheduling packet and the transmission bandwidth of the downlink data falls in the first bandwidth range;
when it is determined that the transmission bandwidth of the first scheduling packet is greater than or equal to the first control threshold, determining a target quantity according to the first control threshold, wherein the target quantity is less than or equal to a first quantity of IEs comprised in the first scheduling packet; and
generating a second scheduling packet according to the target quantity determined, wherein the second scheduling packet comprises a second IE that carries resource allocation information for a second uplink period, the resource allocation information for the second uplink period indicates a transmission resource to be used by the user equipment to send uplink data in the second uplink period, a second quantity of IEs comprised in the second scheduling packet is less than the target quantity, and the second uplink period follows the first uplink period;
wherein the apparatus is in a hybrid fiber-coaxial network system.

7. The apparatus according to claim 6, wherein the program further includes instructions for:
allocating one target IE to a plurality of uplink transmission resource requests, wherein the target IE carries resource allocation information of uplink data that corresponds to the plurality of uplink transmission resource requests, the plurality of uplink transmission resource requests are from same user equipment, and services corresponding to the plurality of uplink transmission resource requests have a same service type; and
generating the second scheduling packet comprising the target IE.

8. The apparatus according to claim 7, wherein the program further includes instructions for:
allocating one target IE to a plurality of uplink transmission resource requests that carry a same service identifier, wherein the service identifier uniquely indicates the user equipment and the service type.

9. The apparatus according to claim 6, wherein a duration of the second uplink period is greater than a duration of the first uplink period.

10. The apparatus according to claim 6, wherein the apparatus is a cable modem termination system, the user equipment is a cable modem, and the first scheduling packet is a bandwidth allocation mapping packet.

11. A non-transitory computer-readable storage medium storing a program to be executed by a processor, the program including instructions for:
determining a transmission bandwidth of a first scheduling packet, wherein the first scheduling packet comprises a first information element (IE) that carries resource allocation information for a first uplink period, and the resource allocation information for the first uplink period indicates a transmission resource to be used by user equipment to send uplink data in the first uplink period;
determining a first control threshold according to a transmission bandwidth of downlink data, wherein determining the first control threshold according to the transmission bandwidth of the downlink data comprises:
determining one or more preset thresholds, wherein each of the one or more preset thresholds corresponds to a respective bandwidth range of one or more bandwidth ranges; and
determining the first control threshold from the one or more preset thresholds according to a first bandwidth range of the one or more bandwidth ranges, wherein a sum of the transmission bandwidth of the first scheduling packet and the transmission bandwidth of the downlink data falls in the first bandwidth range;
when it is determined that the transmission bandwidth of the first scheduling packet is greater than or equal to the first control threshold, determining a target quantity according to the first control threshold, wherein the target quantity is less than or equal to a first quantity of IEs comprised in the first scheduling packet; and
generating a second scheduling packet according to the target quantity determined, wherein the second scheduling packet comprises a second IE that carries resource allocation information for a second uplink period, the resource allocation information for the second uplink period indicates a transmission resource to be used by the user equipment to send uplink data in the second uplink period, a second quantity of IEs comprised in the second scheduling packet is less than the target quantity, and the second uplink period follows the first uplink period;
wherein the non-transitory computer-readable storage medium is comprised in a device in a hybrid fiber-coaxial network system.

12. The non-transitory computer-readable storage medium according to claim 11, wherein the program further includes instructions for:

allocating one target IE to a plurality of uplink transmission resource requests, wherein the target IE carries resource allocation information of uplink data that corresponds to the plurality of uplink transmission resource requests, the plurality of uplink transmission resource requests are from same user equipment, and services corresponding to the plurality of uplink transmission resource requests have a same service type; and generating the second scheduling packet comprising the target IE.

13. The non-transitory computer-readable storage medium according to claim 12, wherein the program further includes instructions for:

allocating one target IE to a plurality of uplink transmission resource requests that carry a same service identifier, wherein the service identifier uniquely indicates the user equipment and the service type.

14. The non-transitory computer-readable storage medium according to claim 11, wherein a duration of the second uplink period is greater than a duration of the first uplink period.

* * * * *